United States Patent [19]

Pusch

[11] 4,188,531
[45] Feb. 12, 1980

[54] APPARATUS FOR SCANNING AN AIR SPACE FOR DETECTING LOW-FLYING AIRPLANES AND FLYING BODIES

[76] Inventor: Günter Pusch, Bannholzweg 12, 6903 Neckargemund-Dilsberg, Fed. Rep. of Germany

[21] Appl. No.: 829,674

[22] Filed: Sep. 1, 1977

[51] Int. Cl.² .............................................. H01J 31/49
[52] U.S. Cl. ..................................... 250/334; 250/342
[58] Field of Search ............. 250/330, 334, 338, 340, 250/341, 342, 347, 349, 352, 353, 203; 356/4, 141

[56] References Cited

U.S. PATENT DOCUMENTS 3,886,360  5/1975  Reiss et al. ........................... 250/353
4,087,689  5/1978  Asawa ................................... 250/347

Primary Examiner—Davis L. Willis
Attorney, Agent, or Firm—Haseltine, Lake & Waters

[57] ABSTRACT

Infra-red sensing apparatus for scanning an air space for detecting low-flying airplanes and flying bodies comprising a rotatable modulation screen arranged on a planar circular disc, and optical devices including mirrors and prisms for transmitting images from objectives, each covering a segment of the scanned air space, to the planar disc.

8 Claims, 3 Drawing Figures

APPARATUS FOR SCANNING AN AIR SPACE FOR DETECTING LOW-FLYING AIRPLANES AND FLYING BODIES

FIELD OF THE INVENTION

The invention relates to apparatus for scanning an air space for detecting the presence of low-flying bodies in said space.

PRIOR ART

A method and device for scanning an airspace by means of infrared sensors and with laser beams are known, especially for detecting the presence of low flying airplanes and flying bodies. An essential feature of this known method consists in that a greater number of collecting lenses are arranged along a curved surface so that an entire sector can be scanned and can be divided into individual small space angles. A rotating drum which covers the scanning field of all of the objectives is provided with modulation screens arranged in conformity with the scanning field to effect a modulation and location of a discriminated object.

My earlier German Pat. No. 2,220,316 and the equivalent British Pat. No. 1,431,792 disclose an infra-red detector comprising an array of objectives extending over a part-spherical surface to define a scanning field, an array of infra-red detectors and a rotatable curved modulation drum between the objectives and the detectors. The detectors are connected to an electronic system which on the basis of the modulation provides information concerning azimuth and elevation of a discriminated target by determining which of the objectives sights the target. The afore cited patents are particularly concerned with the modulation drum and the specific arrangement of a checkerboard pattern of a modulation field.

OBJECT OF THE INVENTION

It is an object of the present invention to greatly simplify the structural design of this known device and, particularly, to replace the scanning arrangement with the cured modulation drum by a simpler arrangement.

BRIEF DESCRIPTION OF THE DRAWINGS

The above and other objects and advantages of the invention will appear more clearly from the following specification in connection with the accompanying drawings, in which.

SUMMARY OF THE INVENTION

The device according to the present invention is characterized primarily in that the screen effecting the modulation is annularly arranged on a plane circular disc on which bundles of rays coming from different angular segments of the scanned field are transmitted through the intervention of mirrors and prisms. According to a further feature of the invention, the objectives for the observation of a certain elevational region are arranged on a conical or cylindrical surface.

If the diameter of the annular modulation grid is made sufficiently large, there will be obtained a further possibility, namely that the image of the partial space angle of a plurality of elevational ranges can be effected on one and the same annular modulation grid.

Since, in accordance with the invention, the picture fields of all partial space angles are located in the same picture field plane, the detectors associated with each partial space angle can likewise be arranged in one planar and can be connected to a common plane base plate.

Since the detectors have to be cooled in order to obtain an optimum sensitivity, a pre-cooling of the detectors can be effected by means of the above mentioned base plate.

Inasmuch as a cooling to the required final cooling temperature by means of the base plate would require too high a cooling power, it is suggested according to the present invention to cool the detectors additionally and individually, preferably thermoelectrically.

The advantages realized according to the present invention consist primarily in a structurally simple design of the modulation arrangement, a good accessibility of the detectors and a simple, reliable design and manufacture of the lens holding means.

DETAILED DESCRIPTION

Figure 1:
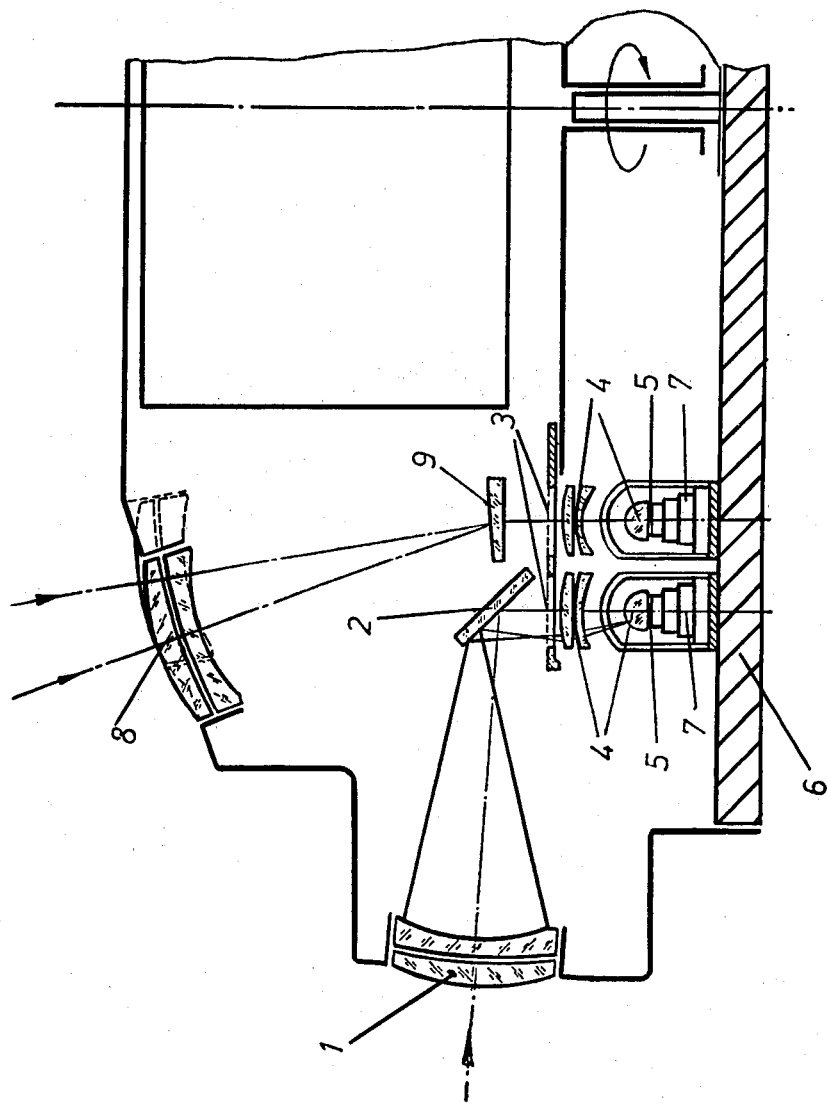
FIG. 1 is a longitudinal sectional view which diagrammatically illustrates a first embodiment of the present invention.

Referring now to the drawings in detail, FIG. 1 shows an embodiment of the invention in which objectives 1 are arranged on a cylindrical surface. Light rays passing through objectives 1 are reflected by into the plane of a picture field in which there is located an annular modulation screen 3. A field lens system 4 focuses the light rays passing through the screen 3 onto the detector elements 5. The detectors 5 are arranged in the same plane and supported by a common base plate 6. A four-stage thermoelectric cooler 7 effects a cooling to about $-100°$ C. The base plate 6 can be pre-cooled by air or liquid gas cooling (freon) to a temperature of between $+10°$ and $-40°$ C. Instead of the thermoelectric cooler, for detectors which require a greater cooling temperature, as for instance from 70° to 80° K., there is provided a liquid gas cooling known per se.

The objectives 8, which serve for the observation of flying bodies arriving at a high angle of elevation, approximately from the zenith, are arranged on corresponding conical surfaces. In this instance, prisms 9 serve for deflecting the light rays into the picture field or modulation plane.

Figure 2:
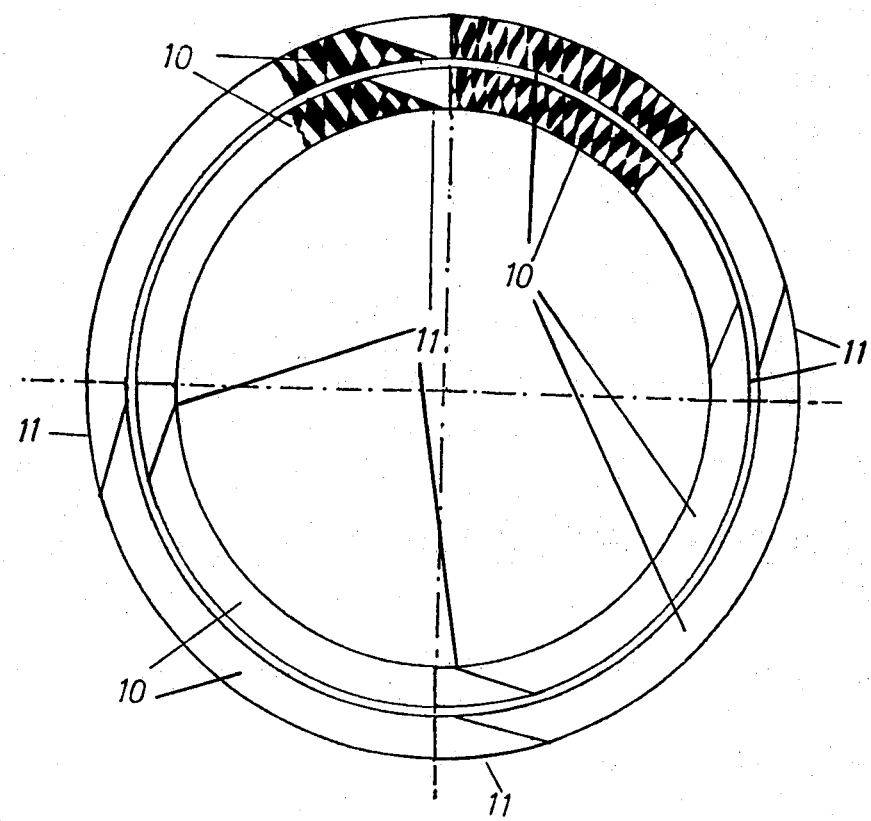
FIG. 2 is a plan view of annular modulation screens which are provided with corresponding interruptions for precisely locating the target on the scanning field.

FIG. 2 shows in plan view the annularly formed modulation screen 10 which is provided with trapezoidal-shaped interruptions 11 for a more precise location of the target point in the picture field. The remainder of the modulation screen between the interruptions is of conventional construction and is constituted by opaque and transparent areas to provide modulation effect for discrimination of the target.

Figure 3:
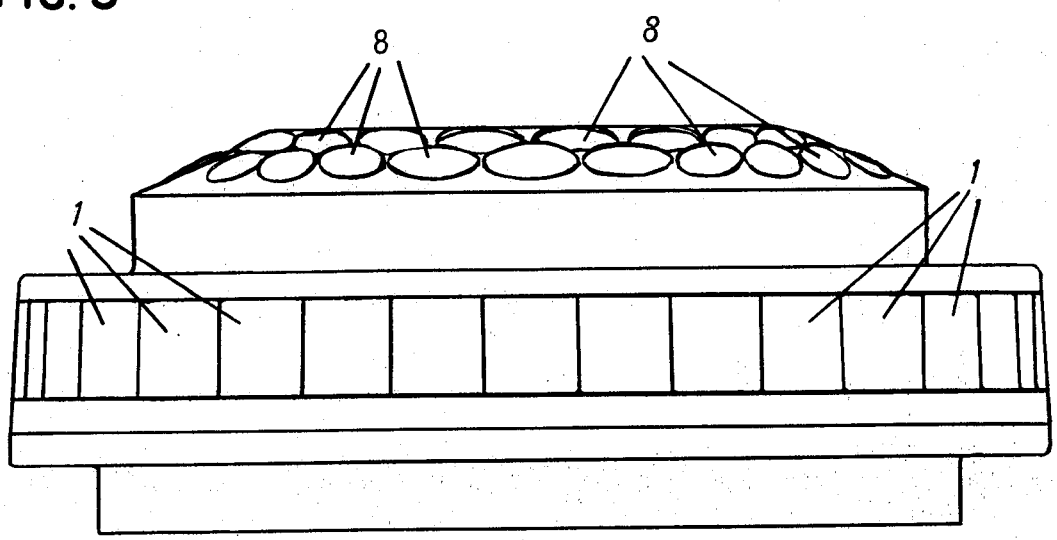
FIG. 3 is an elevational view which diagrammatically illustrates the overall device according to the present invention.

FIG. 3, which shows the entire device in elevation, illustrates the objectives 1 for scanning a field near the horizon, the objectives 1 extending on a cylindrical surface, and the objectives 8 for scanning a field near the zenith, the objectives 8 extending on a conical surface.

It is, of course, to be understood that the present invention is by no means limited to the specific illustration in the drawings but also comprises any modifications within the scope of the appended claims.

What I claim is:

1. In a device for scanning an air space to detect low-flying objects comprising objective lens means distributed over a surface for scanning the air space and producing images thereof, modulation means for modulating the images of the scanned air space from said objective lens means to discriminate the presence of a target, and detector means receiving the modulated images for indicating the presence of a discriminated target and the location thereof, the improvement wherein said modulation means comprises a planar disc with a modulation screen thereon, and optical deflecting means for deflecting light rays coming from said objective lens means to said planar disc in a path perpendicular to said disc.

2. The improvement as claimed in claim 1 further comprising a body of revolution having an outer surface, said objective lens means comprising first and second arrays of objective lenses on said outer surface for scanning respective air spaces with different angles of elevation.

3. The improvement as claimed in claim 2 wherein said planar disc includes one said modulation screen for each array of objective lenses.

4. The improvement as claimed in claim 1 wherein said detector means comprises a plurality of detectors each associated with a respective objective lens of said objective lens means, the improvement wherein said detectors are located in a common plane and a common, planar, base plate is provided which supports said detectors thereon.

5. The improvement as claimed in claim 4 further comprising means for pre-cooling said base plate.

6. The improvement as claimed in claim 5 further comprising thermo-electric cooling means for additionally and individually cooling said detectors.

7. The improvement as claimed in claim 4 further comprising means for cooling said detectors individually.

8. The improvement as claimed in claim 1 wherein said optical deflecting means comprises mirrors and prisms between said objective lens means and said planar disc.

* * * * *